United States Patent [19]

Galton et al.

[11] Patent Number: 5,049,262

[45] Date of Patent: Sep. 17, 1991

[54] MODULAR SYSTEM

[76] Inventors: Zanley F. Galton, 2925 SW. Canterbury La., Portland, Oreg. 97201; Lynn A. Russell, 52712 Round House La., Scappoose, Oreg. 97056; L. Allen Dorn, 31008 Washougal River Rd., Washougal, Wash. 98671

[21] Appl. No.: 439,969

[22] Filed: Nov. 20, 1989

Related U.S. Application Data

[63] Continuation-in-part of Ser. No. 275,216, Nov. 23, 1988, abandoned.

[51] Int. Cl.$^5$ ............... B07B 1/46; B07B 1/18; F16B 21/14
[52] U.S. Cl. .................. 209/399; 209/407; 209/408; 411/508
[58] Field of Search ............ 209/392, 397–399, 209/404–414, 319; 24/297, 453; 411/508–510, 913

[56] References Cited

U.S. PATENT DOCUMENTS

| | | | |
|---|---|---|---|
| 1,857,490 | 5/1932 | Barrett | 411/508 X |
| 2,118,800 | 5/1938 | Smith | 411/508 X |
| 3,251,103 | 5/1966 | Saut | 24/297 |
| 3,733,655 | 5/1973 | Kolibar | 411/508 X |
| 3,893,208 | 7/1975 | Yuda | 411/508 |
| 3,980,555 | 9/1976 | Freissle | 209/408 |
| 4,120,784 | 10/1978 | Hassall | 209/399 |
| 4,141,821 | 2/1979 | Wolff | 209/405 |
| 4,219,412 | 8/1980 | Hassall | 209/399 |
| 4,222,865 | 9/1980 | Valeri et al. | 209/399 |
| 4,278,535 | 7/1981 | Wolff | 209/399 |
| 4,409,099 | 10/1983 | Wolff | 209/399 |
| 4,661,245 | 4/1987 | Rutherford et al. | 209/399 |
| 4,670,136 | 6/1987 | Schmidt et al. | 209/403 |

FOREIGN PATENT DOCUMENTS

| | | | |
|---|---|---|---|
| 0167999 | 1/1986 | European Pat. Off. | 209/399 |
| 0202863 | 11/1986 | European Pat. Off. | 209/408 |
| 1155963 | 10/1963 | Fed. Rep. of Germany | 209/408 |
| 3606854 | 9/1987 | Fed. Rep. of Germany | 209/399 |
| 2574007 | 6/1986 | France | 209/399 |
| 1433509 | 10/1988 | U.S.S.R. | 209/399 |

OTHER PUBLICATIONS

Isepren Modular System WS 85, by Isenmann America Inc., 415 Hayman Avenue, Lexington, KY 40508, Jun., 1989.

Primary Examiner—Michael S. Huppert
Assistant Examiner—Edward M. Wacyra
Attorney, Agent, or Firm—Marger, Johnson, McCollom & Stolowitz, Inc.

[57] ABSTRACT

A system for screening particulate material includes replaceable screening modules mounted to a rigid frame by lock pins. The lock pins are fixed into mounting holes in the frame and interlockingly and removably engage recesses in the sidewalls of the screening modules so that the lock pins remain fixed to the frame while allowing the modules to be removed and replaced as required due to wear or to change sieve size. A split lock pin is provided for removably connecting the module to the frame along an outboard edge of the frame while maximizing screening area. An improved elongate frame member is arranged to avoid abrasive wear of the frame.

39 Claims, 6 Drawing Sheets

FIG. 11

MODULAR SYSTEM

RELATED APPLICATION

This is a continuation-in-part patent application of pending prior application U.S. Ser. No. 07/275,216, filed on Nov. 23, 1988 now abandoned.

BACKGROUND OF THE INVENTION

The invention relates to a modular system, to methods and apparatus for removably retaining the modules on a rigid underlying support surface, particularly to screening decks for screening particulate material and impact surfaces for diverting particulate material, the modules being removed and replaced easily as circumstances require. Another aspect of the invention includes an improved screening deck frame design.

Various screening decks and screening elements are known which are intended for the same general purposes. An example of a crowned screening element is shown in U.S. Pat. No. 4,120,784. The screening element is crowned in order to pretension the element for greater strength. However, crowned elements are difficult to remove and install and wear unevenly.

Various ways are known for connecting a screening element to an underlying frame to form a screening deck. Some methods require spacers or adapter bars between the screening element and the frame. An example of such an arrangement is shown in U.S. Pat. No. 4,409,099. That patent shows screening elements supported only at their corners on spacer elements so that the screening element is spaced above the frame, ostensibly to increase the effective screening area. The intermediate spacer elements add considerably to the cost and complexity, and increase the height of the overall screening apparatus. Additionally, specially formed frame members are required to reduce abrasion of frame members by the sifted particulate material. That requirement represents an expensive departure from standard practices in the industry.

Another screening apparatus that employs specialized components intermediate the screening elements and the support frame is shown in U.S. Pat. No. 4,219,412. There, a molded plastic frame is adapted to receive individual screening elements. The plastic frame, in turn, is connected to the frame. This combination leads to several disadvantages similar to the device of the U.S. '099 patent mentioned above. The '412 patent does not disclose whether or how individual screening modules might be removed and replaced.

Similarly, U.S. Pat. No. 4,661,245 shows a screening system that incorporates clamping bars which receive the individual screening elements. The clamping bars, in turn, are bolted onto the frame. The resulting structure is unduly complex, expensive, increases the height of the deck and suffers other shortcomings described below.

Several methods also are known for connecting flat screening elements directly to a supporting frame. One method is the use of a depending hook or skirt member integrally formed in the outlet side of the screening element. An example is shown in U.S. Pat. No. 3,980,555. According to that invention, depending hooks of abutting screening elements are inserted into a frame member through a common mounting hole. The hooks extend out of the mounting hole on the underside of the frame and engage the frame member to hold the screening elements in place. The resulting screening deck has a substantially contiguous inlet surface that provides no access to the mounting hooks for disconnecting an element which requires replacement. Accordingly, such arrangements require a user to climb under a screening deck and cut the depending hooks off of a module to be replaced. Or, more commonly, a user will pry the element off from the top (inlet side) and destroy it in the process. Either way, the module is rendered useless; a result that is acceptable for modules which are worn out, but wasteful if the module is being replaced merely to change sieve size.

Another attachment method is shown in U.S. Pat. No. 4,219,412, discussed above. There, individual screening elements are connected to an intermediate supporting frame by integrally formed depending hook-shaped members, similar to those disclosed in the U.S. '555 patent. Here, however, the depending hook members are inaccessible even from the outlet side of the screen, as they are enclosed within elongate U-shape channels. The '412 patent does not disclose any way of removing an individual screening element for replacement, short of disassembling the screening deck.

Another method of connecting screening elements to an underlying frame is to employ securing pins as suggested, for example, in U.S. Pat. No. 4,141,821. According to that invention, abutting screening elements each include hollow tubular protrusions extending through a common mounting aperture formed in the frame so as to define a hollow tube. A securing pin is inserted into the tube from the inlet side of the deck to spread the protrusions apart beneath the aperture and thereby engage the frame.

The securing pin taught in '821 is difficult to pry out of the tube. The pin perhaps could be driven out from the outlet side of the screen. In any event, once removed, the pin is loose and therefore subject to loss. This is a decided risk in the context of screening machines, as it often is impractical or impossible to retrieve an errant securing pin. A similar securing pin is employed in the apparatus disclosed in U.S. Pat. No. 4,409,099.

Yet another apparatus for removably mounting screening elements is disclosed in U.S. Pat. No. 4,670,136. That patent discloses a two-piece elongate clamping element for clamping the edge of a plastic module or wire mesh screen. The apparatus includes a first, lower plastic profile fastened to the frame and arranged to engage under the edges of at least two mutually adjacent screen elements. A second, upper profile is detachably fastened over the first lower profile for retaining the screen elements clamped in place. Removal of a screening element requires removal of the upper plastic profile, thereby subjecting it to risk of loss like the securing pins of the U.S. '821 patent and the like. Additionally, the clamping structures of the U.S. '136 patent extend substantially beyond the edges of the frame, thereby reducing the effective screening area and subjecting the clamping structure itself to excessive wear from abrasion by particulate material being screened.

Another problem common to known screening apparatus is destructive abrasion of frame members by particulate material that passes through screening elements. Such material abrades exposed portions of the frame members after it exits the outlet side of the module adjacent frame members. U.S. Pat. No. 4,409,099 above teaches use of a special coating and a specially formed sectional shape of the frame member to ameliorate this problem. However, coating adds significantly to the manufacturing cost of the frame with questionable improvement in frame life. The specialized frame member shape requires custom material and undesirably increases the height of the screening deck.

Accordingly, the need remains for a system for screening particulate material which provides for fast, convenient and nondestructive replacement of screening modules and avoids abrasive wear of the underlying support surface. There also remains a need for a system for diverting particulate material which includes impact elements which are fast and convenient to remove and replace with respect to the support structure.

SUMMARY OF THE INVENTION

An object of the present invention is to provide a screening or an impact system which does not require specialized spacers or adaptation strips intermediate the screening or impact elements and the underlying support surface, such as a frame or the like. Another object of the present invention is to provide effective means for removably retaining screening or impact elements on a support surface or frame without the use of securing pins, bolts or other parts which must be removed in order to remove a screening or diverting element and therefore are subject to being lost. Another object of the present invention is to maximize effective screening or impact area while providing for removing a screen or diverter from the inlet side of the screening or impact apparatus without requiring access to the underside of the support surface.

Yet another object of the present invention is to provide for removal of screening or impact elements without damage to the element or to the mounting surface or apparatus. Still a further object of the present invention is to achieve the foregoing objects in a flat screening or impact system to avoid uneven wear of screening or impact elements. An additional object is to provide for removal of screening or impact elements positioned along the outboard edge of the system without requiring removal of edge wear protector strips.

Another object of the invention is to reduce or eliminate wear of screening deck frame members due to abrasion by the particulate material being screened.

The present invention includes a screening or impact system. In the case of screening operations, the screening system or deck generally including a support surface, in the typical case a substantially rigid frame defining a series of apertures, a series of screening modules, are positioned on the support surface. The screening apertures are provided in the module for allowing particulate material up to a predetermined sieve size to pass through the support surface. A plurality of lock pins for removably securing the modules to the support surface are included, whereby the lock pins remain fixed to the support surface while allowing the modules to be removed and replaced as needed. In the case of impact operations, a solid module, without screening apertures, is employed in place of the screening module. Particulate material is directed in a flow path toward the solid module. When the material contacts the solid module it is diverted to an alternate flow path for accumulation of the material at a predetermined location.

The frame includes a series of rigid elongate members spaced apart in parallel relation and a series of cross members interconnecting the elongate members at right angles. The frame members thus define a series of rectangular screening apertures. The elongate frame members each include a series of mounting apertures. Each screening module is positioned on the frame covering a respective screening aperture for allowing only particulate material that passes through the screening module to pass through the frame. The lock pins are lockingly engaged in the mounting apertures and removably engaged with the modules. Preferably, lock pins are spaced apart along two opposite sides of the module.

Each lock pin includes a base portion for locking engagement in the mounting aperture for fixing the pin to the frame, and an adjacent head portion for interlockingly and removably engaging the module to maintain the positioning of the screening module on the frame. The lock pins and the screening modules are formed of a resilient material, except as otherwise specified. The base portion of each lock pin includes an annular recess sized to engage the elongate frame member about the periphery of a mounting hole. The base portion further includes a transverse slot having interior walls longitudinally extending into the lock pin from the bottom end, whereby the diameter of the base portion below the recess can be reduced by moving the interior walls together to facilitate insertion of the base portion through the mounting aperture. Additionally, the base portion is tapered inwardly below the annular recess and rounded adjacent the bottom end so as to form a blunt nose to facilitate inserting the base portion into the mounting aperture.

Any of the systems of the present invention can interchangeably include any module which can be combined with the subject lock pin and underlying support surface, particularly either a screening or impact module. As an exemplary embodiment of the present invention, a screening module is provided for use in combination with the lock pin and frame. The screening module is generally planar, having parallel inlet and outlet sides, and includes a grid defining an array of sieve apertures for allowing particulate material up to a size corresponding to the sieve aperture size to pass through the screening module. The impact module is of similar design except that it is solid and does not include the sieve apertures. The grid is surrounded by a solid margin. The sieve aperture walls are slanted to enlarge the aperture on the outlet side of the module to prevent particulate material from lodging in the module. The module further includes a sidewall extending around the periphery of the module, and a generally hemi-cylindrical recess of a predetermined diameter formed in the sidewall for receiving the head portion of the pin. Accordingly, the head portion of the pin is generally cylindrical and has a diameter substantially equal to the diameter of the recess for interlocking engagement in the recess, whereby substantially one-half of the head portion extends within the recess in the sidewall of the module. The module includes a channel formed in the sidewall within the recess. Extending parallel to the plane of the module, the head portion of the lock pin includes an annular collar sized for interlocking engagement in the channel for removably retaining the module in said position abutting the frame. The screening module thus is removably secured to the frame without increasing the height of the screening apparatus. Modules may be pried off as required from the top or inlet side of the screen simply by disengaging a selected module from the lock pins that hold it, using a common screwdriver or similar instrument.

Detail of the head portion of the pin includes first and second axially adjoining regions, the first region adjacent the base portion and the second region extending from the first portion to the top end of the pin. The first region is generally cylindrical, having a predetermined diameter sized for engagement into a recess in the module. The second region has a diminished diameter, smaller than the predetermined diameter, for guiding the module into position on the frame. A top portion of the lock pin, when in use, extends above the inlet surface of the screening module, and is rounded to form a hemispherical crown for diverting particulate material into the sieve apertures in the module.

A preferred screening system, which configuration can also be employed for other module systems, includes at least two screening modules arranged as follows. The frame includes first and second adjacent screening apertures and at least one cylindrical mounting aperture intermediate the first and second screening apertures. The first and second screening modules are positioned on the frame abutting each other and covering the first and second screening apertures, respectively. A lock pin is provided including a base portion lockingly engaged in one of the mounting apertures and a head portion removably engaging each of the screening modules, whereby the lock pin remains fixed to the frame while allowing either or both of the modules to be removed and replaced.

The first and second screening modules each have a recess substantially as described above, including a channel formed in the recess, and the modules are positioned so that the recess in the respective sidewalls of the modules are registered with each other to define, in combination, a substantially cylindrical recess. The head portion of the lock pin is generally cylindrical and has a diameter substantially equal to the diameter of the cylindrical recess for interlocking engagement in the cylindrical recess, whereby substantially one-half of the head portion extends within the recess in the first module and the other half of the head portion extends within the recess in the second module. The head portion of the lock pin further includes an annular collar sized for interlocking engagement in the channels for removably retaining the abutting modules in position abutting the frame.

The module and the look pin are formed of a resilient material, preferably a polymeric material.

According to another aspect of the invention, the module includes an internal support member extending along the sidewall and encapsulated in the module for maintaining the module generally planar while allowing limited elastic deformation of the module adjacent the recess to allow interlocking engagement and disengagement of the pin and the module without damage to either the pin or the module. The internal support member includes an indentation extending generally alongside the recess for strengthening the module about the recess to resist deformation in the direction of material flow while allowing deformation laterally to disengage the module from the pin by inserting a appropriate pry instrument from the inlet side between the pin and the module.

According to another aspect of the invention, the frame supporting the modules includes a plurality of parallel, spaced apart elongate members, each having a tapered, inverted U-shape cross section. A top section of the elongate member is flat and abuts the outlet side of the screening modules to support them. Mounting holes are spaced apart and centered along the top of the elongate member for receiving lock pins.

The top section of the improved frame member has a width approximately equal to twice the width of the solid peripheral margin of the screening module so that a pair of side-by-side abutting modules may be positioned atop the elongate member, each extending approximately to the center of the elongate member. Screening modules are positioned on the frame and are removably retained there by lock pins as described above. In this arrangement, the elongate frame member does not extend into the material flow path, so it is not subjected to abrasive wear. Effective screening area thus is maximized without sacrificing structural integrity.

Another aspect of the invention includes means for removably connecting a screening module along an outboard edge of a screening deck so as to maximize the useful screening area of the deck. A generally semicylindrical split lock pin having one flat side is fixed to the frame edge member with the flat side aligned with the outside edge of the frame edge member. The frame edge member need be no wider than the screening module margin, thereby incurring no loss of screening area long the edge of the deck. The split lock pin is sized to engage the semicylindrical recess in the sidewall of the module for positioning the module, as described above. The split lock pin includes an semi-annular collar for engaging a corresponding channel extending along an interior wall of the recess in the module for holding the module abutting the frame member. The split lock pin is formed of a rigid material. The screening deck edge module is removed by first disengaging the module and the lock pins along the side of the module opposite the outboard edge of the deck, and then moving the module inboard to disengage the module and the split lock pins.

The foregoing and other objects, features and advantages of the invention will become more readily apparent from the following detailed description of a preferred embodiment which proceeds with reference to the drawings.

DETAILED DESCRIPTION OF A PREFERRED EMBODIMENT

Figures 1, 2:
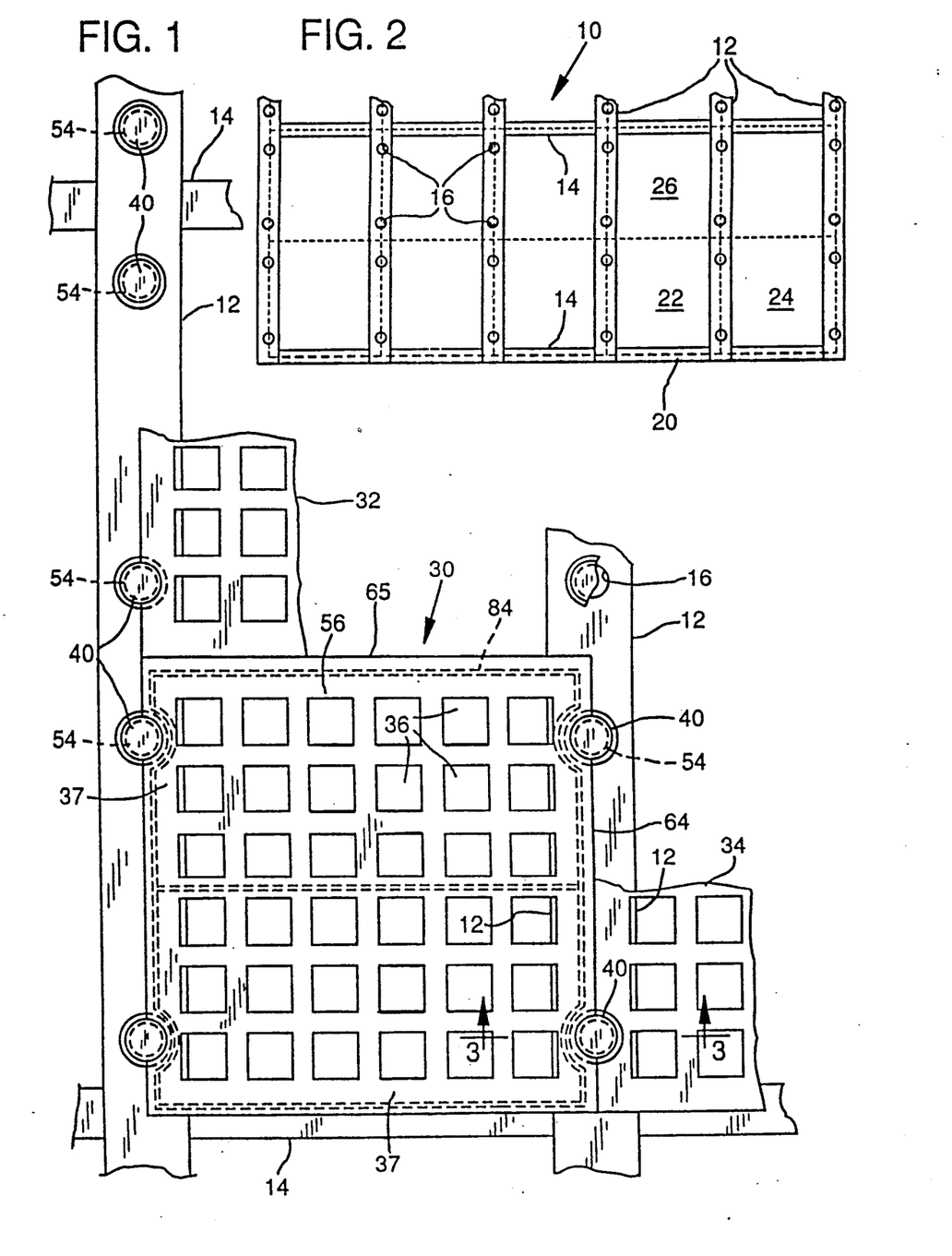
FIG. 1 is a fragmentary top plan view of a screening deck showing an improved screening module removably connected to a conventional frame by four lock pins, in accordance with the present invention.
FIG. 2 is a fragmentary top plan view of a screening deck frame showing the locations of mounting apertures for mounting screening modules to the frame and indicating in dashed lines the positioning of screening modules on the frame.

Referring to FIG. 2, a screening deck frame 10, shown in top view, comprises a series of rigid elongate members 12 spaced apart in parallel relationship. The elongate members 12 are interconnected at regular intervals by cross-members 14 to strengthen the frame and to support screening modules positioned on the frame as further described below. Frame members 12, 14 may be of any suitable cross-sectional shape, though an aspect of the present invention includes a specific improved frame member, described herein subsequently. The frame members are fixed to each for example, by welding to form a rectangular grid.

Frame 10 thus defines a series of screening apertures, delineated by dashed lines 20 in FIG. 2, for example, screening apertures 22, 24 and 26. Adjoining screening apertures, for example, apertures 22 and 26, may be covered by two square screening modules abutting each other end-to-end as shown in FIG. 1 (32, 30). Alternatively, a single rectangular module (not shown) may be positioned on the frame over adjoining apertures such as apertures 22 and 26. Elongate frame members 12 each includes a series of mounting apertures 16 spaced apart along the elongate member and oriented normal to the plane of the elongate member, for positioning and removably connecting screening modules to the frame.

Referring now to FIG. 1, an enlarged fragmentary top view of an assembled screening deck is shown. The screening deck includes a conventional frame, such as shown in FIG. 2, and a series of screening modules 30, 32, 34 mounted onto the frame. The screening modules 30, 32, 34 are substantially identical. Each module includes peripheral sidewalls 64 and endwalls 65. Modules 30 and 34 are arranged with the sidewalls 64 abutting each other in side-to-side relationship such that the abutting sidewalls are substantially centered over elongate frame member 12. Each module straddles two adjacent elongate frame members 12. Module 32 is positioned abutting module 30 in end-to-end relationship. The modules thus abut one another on all sides so as to form a substantially contiguous screening sieve.

Screening module 30 includes a grid defining a array of sieve apertures 36, each of predetermined size, for allowing particulate material up to the predetermined size to pass through the screening module. A solid peripheral margin 37 surrounds the grid for supporting the module on the frame. Cross-members 14 are spaced apart such that two modules 30, 32 cover the pair of screening apertures, such as apertures 22 and 26, intermediate two adjacent cross-members 14. The screening modules 30, 32, 34 are removably connected to elongate members 12 by lock pins 40 as described next.

Screening module 30 includes a top or inlet side 56 and an outlet side 60. Interior walls 38 of each sieve aperture 36 are slanted slightly outwardly toward the outlet side 60 of the module. The sieve apertures 36 thus have a slightly larger dimension at the outlet side to prevent particulate material from becoming lodged in the module.

Figures 1A, 12:
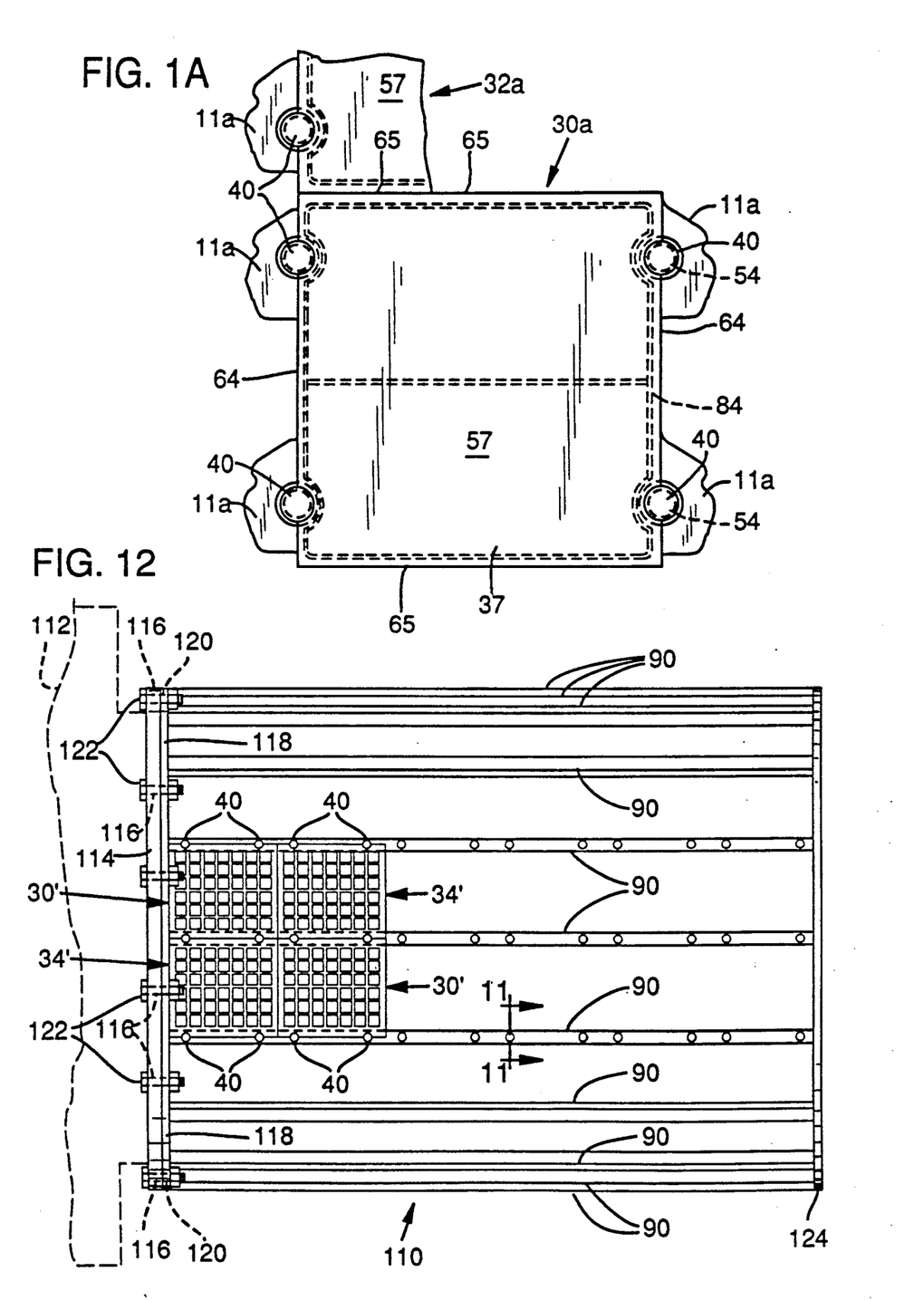
FIG. 1A is a fragmentary top plan view of FIG. 1, except for an improved solid impact module removably connected to an underlying support surface by four lock pins.
FIG. 12 is a side elevation view of the trommel of FIG. 10.

Referring now to FIG. 1a, an enlarged fragmentary top view of an assembled solid impact module system is shown. The system includes a section of an underlying support surface 11, which can comprise various surfaces to which any of the modules can be mounted, such as frame 12 shown in FIG. 2. Other support surfaces including but not limited to, the following: trommels, chutes, transfer points, dump truck boxes, feed boxes, sluices, hoppers, etc. A series of impact modules 30a and 32a are mounted onto the underlying support surface 11. The modules 30a and 32a are substantially identical, although they can be of different configurations such as an impact module in combination with a screening module. Each module includes peripheral sidewalls 64 and endwalls 65, a top impact surface 57 and a bottom surface 60' (see FIG. 4). Module 32a is positioned abutting module 30a in end-to-end relationship. It also includes internal frame 84 as hereinafter described in more detail. The modules are arranged as described with respect to system 10 above to abut one another on all sides so as to form a substantially contiguous screening sieve.

Modules 30a and 32a are solid impact members for diverting particulate material. The modules can be produced from a number of solid impact materials, but is preferably formed of a impact-resistant polymeric material, particularly elastomeric materials. Examples of the polymeric materials which can be employed in scope of the present invention are polyurethane, EPDM, natural rubber, SBR, ABS, butyl rubber, polypropylene, and the like. A solid peripheral margin 37 is provided for supporting the module on the support surface 11a. The screening modules 30a and 32a are removably connected to support surface 11 by lock pins 40 as described above.

Figures 3, 4, 5, 6, 7:
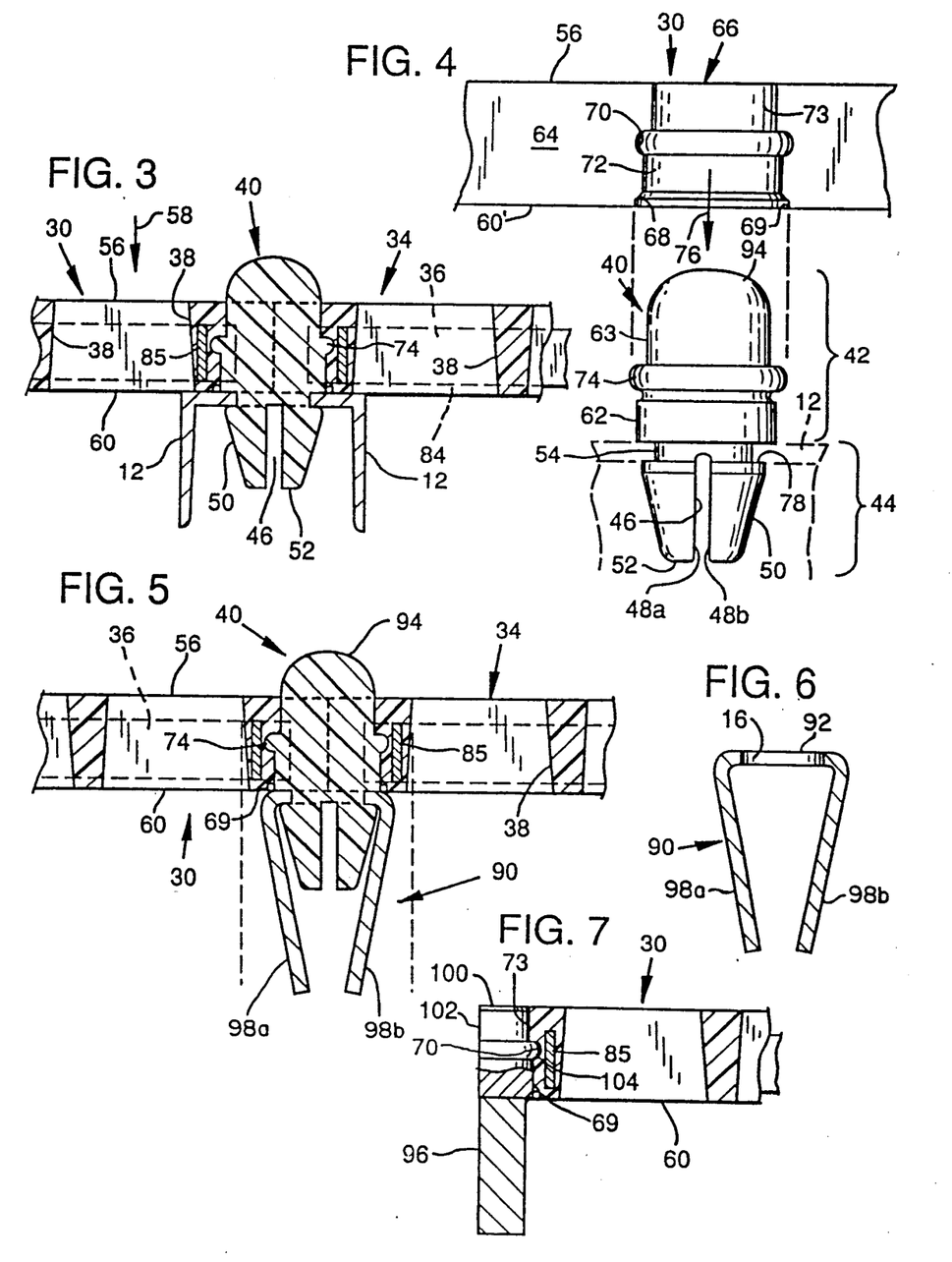
FIG. 3 is a cross-sectional view taken along line 3—3 of FIG. 1 showing in greater detail the interconnection of two abutting screening modules, a lock pin and the underlying frame member.
FIG. 4 is an exploded fragmentary side plan view of a screening module and a lock pin, such as those shown in FIG. 1, aligned for interlockingly and removably engaging each other and further showing a portion of an underlying frame member in phantom.
FIG. 5 is a fragmentary cross-sectional view taken along line 5—5 in FIG. 8, illustrating the interrelationship of an abutting pair of screening modules removably connected by a lock pin to a frame member having a tapered U-shape.
FIG. 6 is a cross-sectional view of an elongate frame member taken along line 6—6 in FIG. 8 with the lock pin removed.
FIG. 7 is a fragmentary cross-sectional view taken along line 7—7 of FIG. 8 showing a split lock pin fixed to a frame edge member and removably engaging a screening module.

Referring now to FIG. 3, a cross-sectional view taken along lines 3—3 of FIG. 1 illustrates use of a lock pin 40 in greater detail. The lock pin 40 is generally cylindrical and includes a head portion 42 and a base portion 44 (FIG. 4). Lock pin 40 is formed of a resilient, preferably polymeric material. The base portion 44 includes an annular recess 54 having a diameter substantially equal to the diameter of mounting aperture 16 in the frame. Prior to installing the screening modules, a lock pin 40 is inserted into each mounting aperture 16 from the top side of the frame.

Lock pin 40 is tapered inwardly along edges 50 and rounded adjacent the bottom end to form a blunt nose 52 to facilitate insertion of the lock pin into the mounting aperture. A transverse slot 46 extends longitudinally into the base portion 44 from the nose 52. The transverse slot has interior walls 48a and 48b. The diameter of base portion 44 below the annular recess 54 thus can be reduced by moving the interior walls 48a, 48b together, to facilitate insertion of the base portion through the mounting aperture 16. Once fully engaged in the mounting aperture 16, as shown in FIG. 3, the base portion lockingly engages the frame member 12 about the mounting aperture 16. Annular shoulder 78 contacts the underside of frame member 12, thereby fixing the lock pin to the frame. The lock pin is very difficult to remove from the frame except by cutting off the base portion. Generally, however, it is unnecessary to remove the lock pin as the present invention allows removal and replacement of screening modules as necessary, without removing the lock pin, as explained next.

As noted, modules 30, 34 include peripheral sidewalls 64. A generally hemi-cylindrical recess 66 is formed in the sidewall 64, having an axis normal to the plane of the module for connecting the module to the frame. Recess 66 is sized to receive a bilaterally symmetric one-half of the head portion 42 of lock pin 40 as illustrated in FIG. 3. The bilaterally symmetric one-half of lock pin 40 is defined by an imaginary plane passing through the longitudinal axis of the lock pin and parallel to the frame member 12. The imaginary plane divides the head portion into a pair of bilaterally symmetric halves. Recess 66 is further illustrated in side view in FIG. 4 and in perspective view in FIG. 9. Recesses 66 in abutting modules 30, 34 in combination form a substantially cylindrical aperture.

Figure 3A:
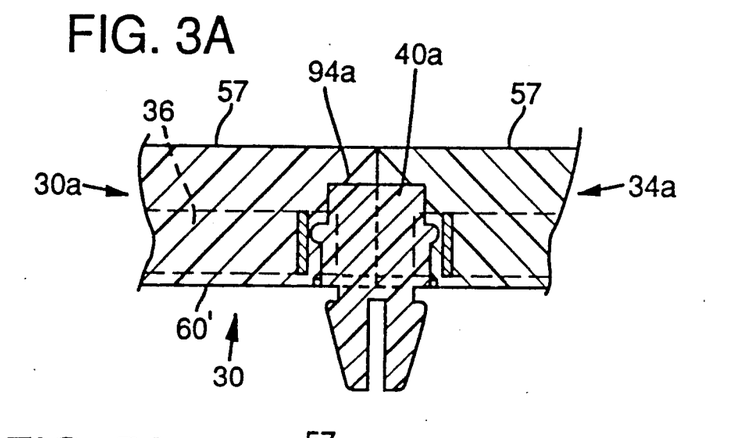
FIG. 3A is the cross-sectional view of FIG. 3, except that it shows the interconnection of two abutting one-piece solid impact modules and a lock pin having a portion of the head section removed.

FIG. 3A depicts the same view as FIG. 3 of the system, except that a pair of solid polymeric one-piece impact modules 30a and 34a (in phantom) are provided instead of modules 30, 34 of FIG. 3. Also, a pin 40a is provided in which the upper portion 63 of pin 40 has been partially removed thereby forming a foreshortened flat top portion 94a.

Referring to FIG. 4, a channel 70 extends along sidewall 64 within recess 66 and parallel to the plane of the module, which can be of solid or apertured construction. Channel 70 thus extends perpendicular to flow direction 58 intermediate the lower portion 72 and upper portion 73 of recess 66. Lock pin 40 includes a corresponding annular collar 74 on the head portion having a cross-sectional configuration complementary to the cross-sectional configuration of channel 70 for interlocking engagement in channel 70 for removably retaining the module in position abutting a support surface, such as frame member 12.

Module 30 is connected to the frame by first installing lock pins 40 on the frame; positioning the module with recess 66 aligned over lock pins 40; and then pressing the module down onto the lock pins as indicated by arrow 76 in FIG. 4 until the outlet side 60 of the module contacts the support frame member 12, thereby interlockingly engaging the lock pin and the module.

The recess 66 may be of uniform diameter, in which case the head portion 42 of lock pin 40 correspondingly would be of uniform diameter. Alternatively, the recess 66 may include a lower portion 72 having a first diameter and an upper portion 73 having a second diameter somewhat less than the diameter of lower portion 72, as shown in FIG. 4. Accordingly, the head portion 42 of lock pin 40 includes a lower portion 62 having a diameter approximately equal to the diameter of lower portion 72 of recess 66 and an upper portion 63, having a diameter approximately equal to the diameter of upper portion 73 of recess 66.

The head portion of the lock pin is rounded at the top end to form a generally hemispherical crown 94 to divert particulate material toward the screening area, i.e. the array of sieve apertures 36. Additionally, recess 66 is enlarged at the outlet side 60 of the module to form inlet portion 69. The recess includes a chamfered region 68 intermediate the enlarged inlet portion 69 and the lower cylindrical portion 72.

Figures 8, 9:
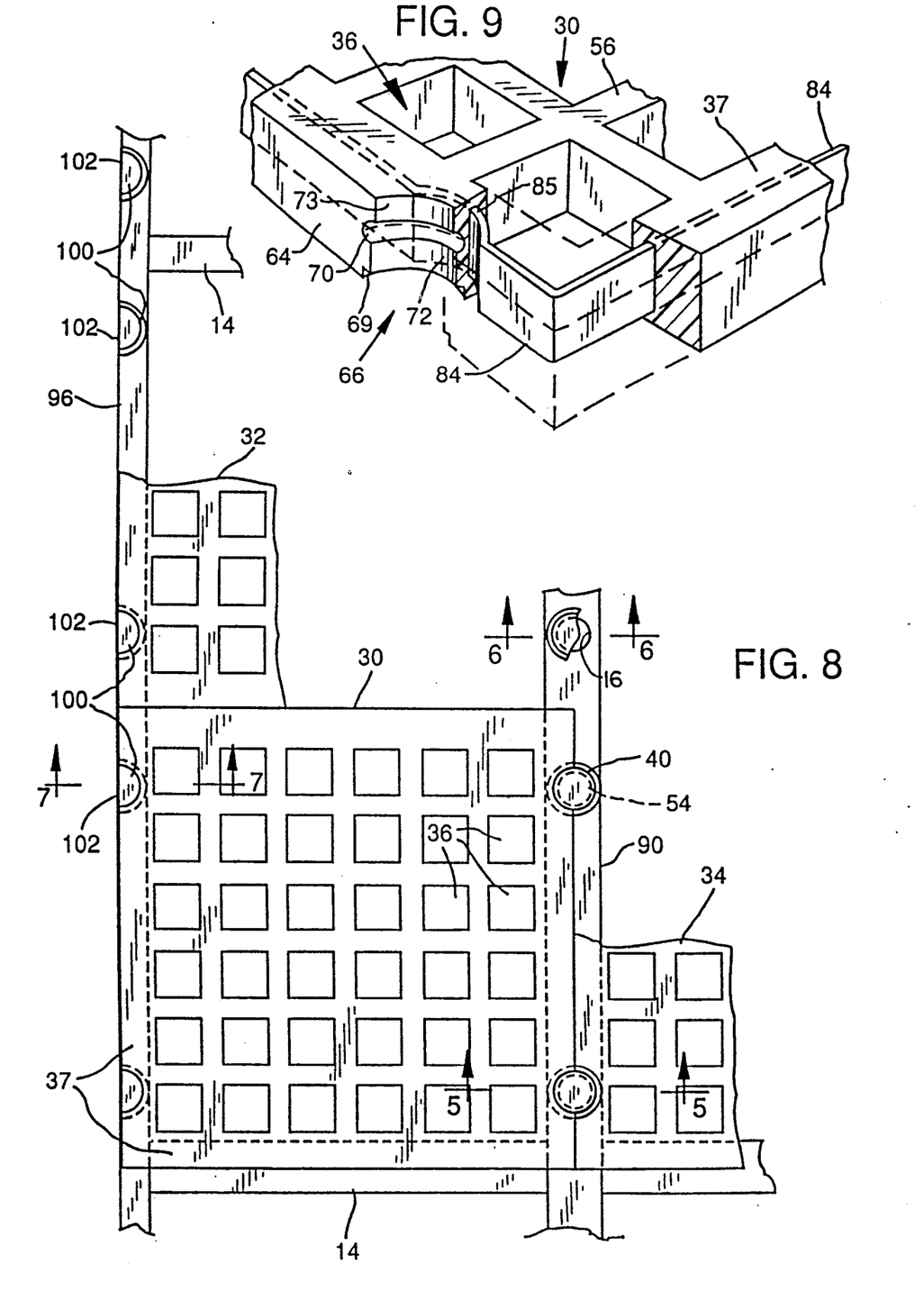
FIG. 8 is a fragmentary top plan view of an improved screening deck, including a screening module removably secured to a frame by four lock pins, the elongate frame members having reduced width and tapered sidewalls so that the frame members are covered by the screening modules and not exposed to abrasion by particulate material passing through the screening modules.
FIG. 9 is a fragmentary perspective view of on corner of a screening module, broken away to show a portion of the internal support member.

An internal support member 84, shown in phantom in FIG. 1 and revealed in FIG. 9 where the module is broken away, is provided to stiffen module 30, particularly to prevent deformation of the module in the flow direction caused by the weight of particulate material on the inlet side of the module. Internal frame 84 is formed of material generally rectangular in cross-section, having its greater dimension parallel to peripheral sidewall 64 of the module. Internal frame 84 is formed to include an indentation 85 extending alongside recess 66 to strengthen the module in the area of the recess for more secure engagement of the module with the lock pin. The arrangement of support frame 84 "on edge", as illustrated, provides maximum rigidity in the direction of flow of particulate material, indicated by arrow 58 (FIG. 3), in order to keep the module flat, while permitting elastic deformation of the module in a direction generally normal to the flow direction, especially around recess 66, to allow engagement and disengagement of the module with the lock pins.

FIG. 5 is similar to FIG. 3 except that FIG. 5 is a cross-sectional view taken along line 5—5 in FIG. 8. FIG. 8 shows screening modules 30,32,34 as described above, but connected to an improved frame. Referring back to FIGS. 1 and 3 for comparison, the elongate members 12 in a conventional frame extend beyond the solid margin 37 of screening aperture 30 and into the material flow path. As a result, particulate material that passes through sieve apertures 36 alongside frame members 12 abrades and thereby wears the frame members. This requires eventual replacement of the frame members 12.

Figure 5A:
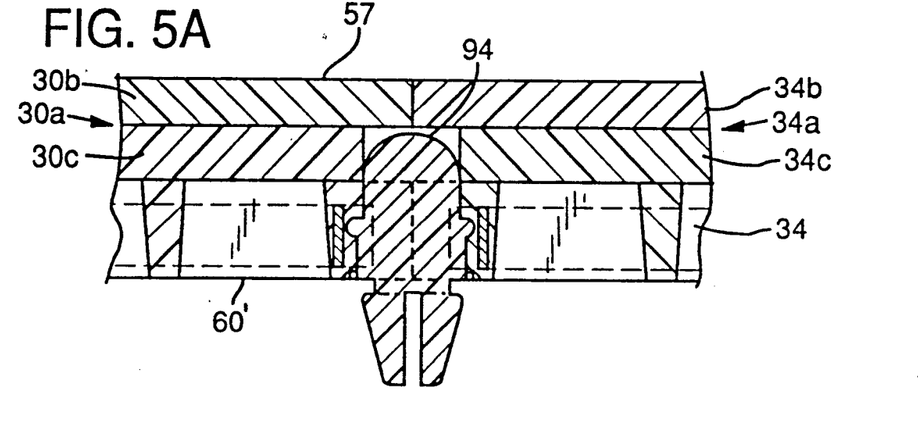
FIG. 5A is the fragmentary cross-sectional view of FIG. 5, except that it illustrates an abutting pair of removably connected solid impact modules, each module being formed of a pair of impact sections of different materials joined one to the other, the head of the lock pin being below the upper surface of the module.

FIG. 5A is similar to FIG. 5, except that FIG. 5A comprises another version of a solid impact module 34a which includes solid impact section 34b attached to screening module 34 described above. The solid impact module 34a can also be of single- or multi-sectional construction, of the same or of a different impact-resistant materials. In this instance, a multi-sectional impact module having respective sections 34b and 34c made of different impact-resistant materials is provided. The respective sections can be adhered one to the other employing, for instance, a conventional high strength adhesive bonding agent. It should be noted that solid impact section 34a extends above and surrounds the top 94 of pin 40.

FIG. 8 shows screening modules 30,32,34 as described above, but connected to an improved frame. Referring back to FIGS. 1 and 3 for comparison, the elongate members 12 in a conventional frame extend beyond the solid margin 37 of screening aperture 30 and into the material flow path. As a result, particulate material that passes through sieve apertures 36 alongside frame members 12 abrades and thereby wears the frame members. This requires eventual replacement of the frame members 12.

Referring now to FIGS. 5 and 6, an improved frame member 90 is shown, having a tapered U-shape cross-section. A flat top section 92 of frame member 90 supports the modules 30,34 as do frame members 12, but the improved frame member 90 does not extend into the path of particulate material passing through the modules. Frame member 90 includes depending sidewalls 98a, 98b. Sidewalls 98a, 98b are tapered inwardly to allow screened material to pass by the frame without contacting the frame member 90, so it is not subject to destructive wear. The sidewalls depend at an angle that is greater than the angle of sieve aperture sidewall 38. Frame members 90 may be interconnected by conventional cross members 14 having, for example, rectangular cross-sectional shape, as the cross members are not exposed to the particulate material.

Referring now to FIGS. 7 and 8, a frame edge member 96 having a rectangular cross-section is incorporated along an outboard edge of the improved screening deck. Frame edge member 96 is approximately half as wide as the top section of frame member 90, i.e., about the same width as the solid margin 37 of the screening module. This maximizes the useful screening area of the screening deck.

A generally hemi-cylindrical split lock pin 100 having a flat side 102 is fixed to frame edge member 96, for example, by welding, for removably connecting one side of module 30 to frame edge member 96. The split lock pin 100 is positioned with its flat edge 102 aligned with the outside edge of frame edge member 96. The split lock pin is sized to fit into recess 66 in the sidewall of module 30 for positioning the module on the frame. Split lock pin 100 includes a semi-annular collar 104 sized for interlockingly engaging the channel 70 in recess 66 like the annular collar in lock pin 40. Split lock pin 100 is formed of a rigid material such as a metal. It need not be resilient like lock pin 40 as module 30 can be removed by first disengaging it from lock pins 40 along the side of the module opposite the frame edge member, and then moving the module laterally to disengage it from split lock pins 100.

Figure 7A:
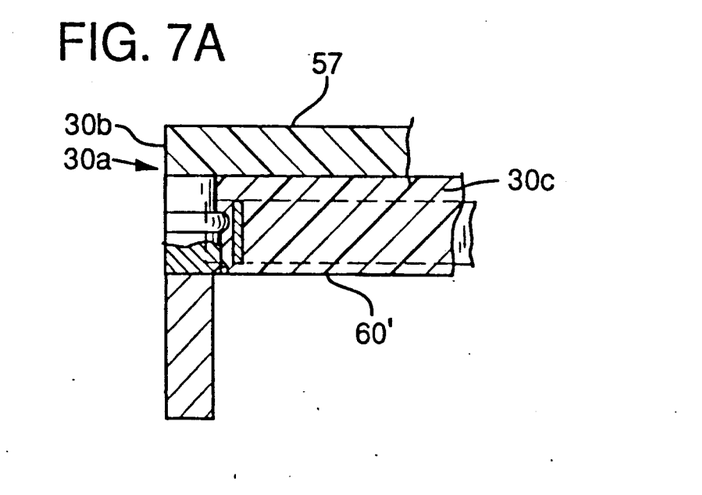
FIG. 7A is the fragmentary cross-sectional view of FIG. 7, except that it shows a removably engaging solid impact module formed of a pair of impact sections of the same material joined one to the other, the respective impact sections having different hardnesses.

FIG. 7 is similar to the system set forth in FIG. 7 above, except that another version of solid impact module 30a is illustratively described. More specifically, solid impact module 30a comprises a multi-sectional construction in which the upper section 30b and the lower section 30c are fabricated of the same impact-resistant material. The distinction between sections 30b and 30c is that they are made at different hardness values. Preferably, the outer section 30b has a higher hardness value than the inner section 30c.

Figure 10:
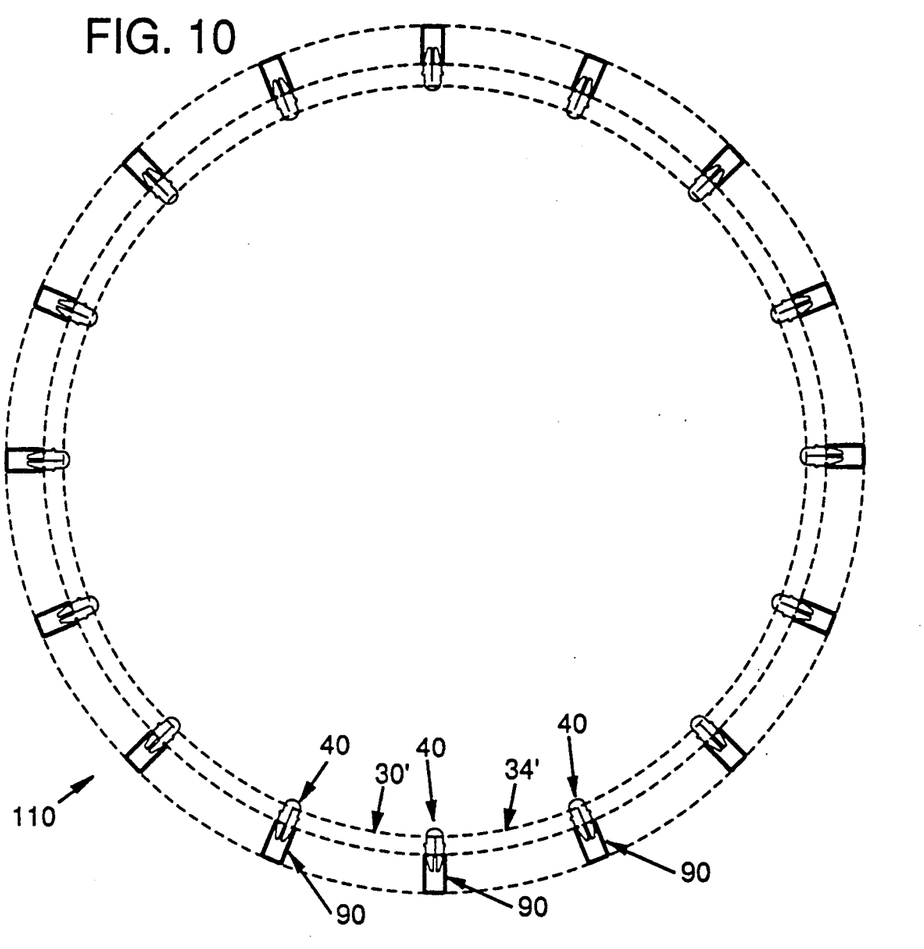
FIG. 10 is an end view of a trommel including the screening module system of the present invention.
Figure 11:
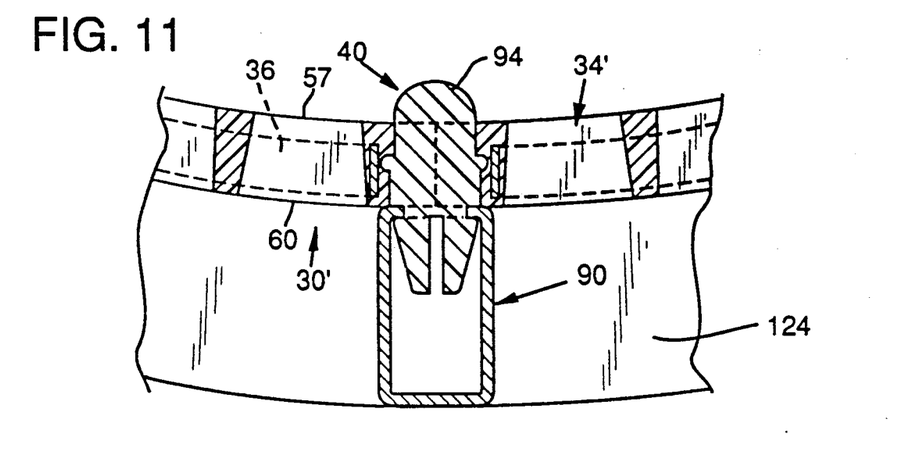
FIG. 11 is a fragmentary end view of the trommel of FIG. 10 taken along line 11—11 of FIG. 12.

Another use of the modular system of this invention is shown in FIGS. 10-12. More specifically, a trommel 110, which is cantilevered at free end 124, is provided for screening particulate material according to a predetermined size by rotation about a horizontally-extended central axis. In the typical case, the material is fed into a means 112 for supporting and rotating the trommel (in phantom in FIG. 12), such as a Sag mill or ball mill. The material passes in a horizontal path through the central passageway of the trommel 110. The undersized particles pass through the sieve apertures of the modules 30' and 34', and the oversized material passes through trommel 110 and out of the free end. The support and rotation means 112 includes at its outlet end a support flange 114 having bolt holes 116 contained therein. The trommel 110 has a support flange 118 includes matching bolt holes 120 to the bolt holes 116. Within these bolt holes 116 and 120, respectively, are bolts 122 which connect the trommel 110 to the support and rotation means 112. Curved screening modules 30' and 34' are attached to an underlying support surface, in this case a plurality of horizontally-extending frame members 90, by pins 40 to form the cylindrical overall shape of the trommel 110. FIGS. 10 and 11 shows the specific manner of attachment of the modules 30' and 34' to the frame 90. Frame members 90 are welded at its respective ends to trommel bolt flange 120 and trommel end flange 124.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A screening system comprising:
   a substantially rigid frame for supporting a plurality of screening modules positioned on the frame, the frame including mounting aperture means;
   each screening module including means defining an array of sieve apertures of a predetermined size for allowing particulate material up to the predetermined size to pass through the screening module, each screening module being positioned on the frame so that particulate material passing through the screening module passes through the frame; and
   a lock pin including means for connecting the lock pin to the mounting aperture means in the frame, and also including means for interlockingly and removably engaging each screening module to maintain the positioning of each screening module on the frame when the lock pin is connected to the frame;
   the lock pin remaining connected to the frame while allowing removal of each screening module from the frame and positioning of a replacement screening module on the frame.

2. A screening system according to claim 1 wherein:
   the lock pin includes a base portion for interlockingly engaging the mounting aperture means and a head portion adjoining the base portion for interlockingly and removably engaging each screening module.

3. A screening system according to claim 2 wherein the base portion is sized for insertion into the mounting aperture means and includes means defining a complimentary recess sized to receive the mounting aperture means to connect the lock pin to the frame in a predetermined position in the mounting aperture means.

4. A screening system according to claim 3 wherein:
the mounting aperture means is cylindrical and has a predetermined diameter; and
the recess means in the base portion is annular and has a diameter complimentary to the diameter of the mounting aperture means.

5. A screening system according to claim 4 wherein:
the base portion is tapered inwardly below the recess to facilitate inserting the lock pin into the mounting aperture means; and
the base portion is rounded adjacent the bottom end to form a blunt nose to facilitate inserting the base portion into the mounting aperture means.

6. A screening system according to claim 5 wherein:
the lock pin is formed of a resilient material; and
the base portion includes means defining a longitudinal slot having interior walls such that the diameter of the base portion below the recess can be reduced by moving the interior walls together to facilitate insertion of the base portion through the mounting aperture means.

7. A screening system according to claim 2 wherein:
each screening module includes a solid margin surrounding the array of sieve apertures, the margin including a peripheral sidewall and means defining a recess in the sidewall for receiving the lock pin;
the head portion of the lock pin and the recess in each screening module sidewall interlockingly engaging each other to position each screening module on the frame.

8. A screening system according to claim 7 wherein:
each screening module defines a flow path for allowing particulate material up to a predetermined size to pass through the screening module along the flow path;
the recess means in the sidewall being substantially hemi-cylindrical and having its axis substantially parallel to the flow path; and
the head portion of the lock pin being substantially cylindrical, whereby a section of the head portion is interlockingly engaged in the recess.

9. A screen system according to claim 8 wherein:
the screening module and the lock pin each is formed of a resilient material;
each screening module includes means defining a channel extending along the sidewall within the recess and perpendicular to the flow path; and
the head portion of the lock pin includes an annular collar sized and positioned on the head portion for interlocking engagement in the channel for removably retaining each screening module abutting the frame.

10. A screening system comprising:
a substantially rigid frame including a plurality of elongate members spaced apart in parallel relation for supporting screening modules;
means defining a plurality of mounting apertures spaced apart along each elongate member and oriented normal to the plane of the elongate member;
a plurality of screening modules, each having a peripheral sidewall, positioned on the frame alongside each other in sidewall-to-sidewall relationship along the elongate members; and
a plurality of lock pins inserted in the mounting apertures, each lock pin including a base portion and a head portion, the base portion lockingly engaged in a corresponding mounting aperture and the head portion removably engaging an adjacent pair of the screening modules, whereby the lock pin remains fixed to the frame while allowing either of the pair of modules to be removed from the frame and replaced on the frame.

11. A screening system according to claim 10 wherein:
each of the adjacent pair of screening modules includes:
means in the sidewall defining a substantially hemi-cylindrical recess of a predetermined diameter having a longitudinal axis normal to the plane of the module for receiving the head portion of the lock pin; and
means defining a channel extending along the sidewall within the recess parallel to the plane of the module;
the pair of modules are positioned so that the recesses in the opposed sidewalls of said modules are registered with each other to define, in combination, a substantially cylindrical recess having a peripheral channel;
the head portion of the lock pin is generally cylindrical, having a diameter substantially equal to the diameter of the cylindrical recess for interlocking engagement in the cylindrical recess, whereby a bilaterally symmetric half of the head portion extends within the recess in a first one of the pair of modules and the other half of the head portion extends within the recess in the second module; and
the head portion of the lock pin further includes an annular collar extending around the head portion, the collar sized for interlocking engagement in the peripheral channel for removably retaining the pair of modules abutting the frame.

12. Screening apparatus for use in combination with a rigid frame, the apparatus comprising:
a plurality of screening modules, each module including means defining an array of sieve apertures of a predetermined size for allowing particulate material up to the predetermined size to pass through the screening module, each screening module being positioned on the frame so that particulate material passing through the screening module passes through the frame; and
a lock pin including means for connecting the lock pin to the frame and also including means for interlockingly and removably engaging each screening module to maintain the positioning of each screening module on the frame when the lock pin is connected to the frame;
the lock pin remaining connected to the frame while allowing removal of each screening module from the frame and positioning of a replacement module on the frame.

13. Screening apparatus according to claim 12, the frame including a plurality of elongate members spaced apart in parallel relationship, wherein:
each screening module includes parallel peripheral sidewalls and defines a flow path, each module positioned on the frame with the sidewalls extending respectively over a corresponding pair of the elongate members;
each screening module also includes means defining a hemi-cylindrical recess of a predetermined diameter in the sidewall, the recess having an axis generally parallel to the flow direction, and means defining a channel extending along the sidewall within the recess and normal to the flow direction;

the lock pin includes a generally cylindrical head portion having a diameter complimentary to the diameter of the recess for interlockingly engaging the recess to maintain the positioning of each module on the frame and also includes an annular collar extending around the head portion, sized and positioned for interlockingly engaging the channel to retain each module abutting the frame.

14. Screening apparatus according to claim 13 wherein each screening module and the lock pin each is formed of a resilient polymeric material to facilitate engagement with and disengagement from each other.

15. Screening apparatus according to claim 13 wherein the head portion terminates in a substantially hemispherical crown extending above an inlet side of each screening module for diverting particulate material toward the array of sieve apertures.

16. Screening apparatus according to claim 13, the elongate members including mounting holes, wherein the means for fixing the lock pin to the elongate member includes a base portion of the lock pin sized for insertion into a mounting hole and having an annular shoulder for engaging the underside of the elongate member around the mounting hole to resist withdrawal of the lock pin from the mounting hole.

17. A lock pin for removably retaining a screening module on a screening frame having a mounting aperture, the lock pin comprising:
a base portion for locking engagement in the mounting aperture to fix the pin to the frame; and
a head portion for removably engaging the screening module for removably retaining the screening module abutting the frame.

18. A lock pin according to claim 17 wherein the lock pin is formed of a resilient material and the base portion includes:
a generally cylindrical region having a diameter greater than the diameter of the mounting aperture;
means in the cylindrical region defining an annular recess having an interior diameter substantially equal to the diameter of the mounting aperture so that, upon engagement of the base portion through the mounting aperture, the base portion lockingly engages the frame about the mounting aperture; and
means in the cylindrical region defining a transverse slot having interior walls, longitudinally extending into the recess from the bottom end, whereby the diameter of the cylindrical region below the recess can be reduced by moving the interior walls together to facilitate insertion of the base portion through the mounting aperture.

19. A lock pin according to claim 18 wherein the base portion is tapered inwardly below the recess to facilitate inserting the lock pin through the mounting aperture.

20. A lock pin according to claim 17 wherein the pin is formed of a resilient polymeric material.

21. A lock pin according to claim 17 wherein the pin has an overall length from about 2.0 to 3.5 inches (5.1 to 8.9 cm), a diameter in the head portion from about 1.0 to 2.0 inches (2.5 to 5.1 cm) and a collar height from about 0.2 to 0.4 inch (0.51 to 1.0 cm).

22. A lock pin according to claim 17 including means for removably engaging a second screening module abutting the screening module in side-by-side relationship on the frame for removably connecting the second screening module to the frame.

23. A generally planar screening module for mounting on a rigid frame, the frame having a plurality of elongate members spaced apart in parallel relationship and having lock pins protruding from the elongate members, the screening module comprising:
means defining a plurality of sieve apertures for screening particulate material;
a solid peripheral margin surrounding the sieve aperture means including parallel sidewalls for mounting the screening module to the frame;
means in each sidewall defining a recess having an axis normal to the plane of the module and sized for interlockingly engaging one of the lock pins; and
an internal support member extending along the margin of the module for maintaining the module generally planar.

24. Screening apparatus according to claim 23 wherein the internal support member is encapsulated within the module and is generally rectangular in cross-section, having its greater dimension parallel to the sidewall, and includes means defining an indentation extending alongside the recess whereby the internal member maintains the module generally planar while allowing elastic deformation of the module adjacent the recess to allow removable engagement of a lock pin in the recess without damage to the module.

25. A screening deck frame for supporting a screening module, the frame comprising:
a plurality of rigid elongate members spaced apart at regular intervals in parallel relationship; and
a plurality of rigid cross members spaced apart at regular intervals in parallel relationship and normal to the elongate members;
the cross members fixed at each end to the elongate members so as to fix the elongate members in a substantially coplanar relationship for supporting the screening module positioned on the frame;
the elongate members each including a flat top section for contacting the screening module and a pair of sidewalls depending from the top section such that the elongate member defines an inverted U-shape in cross section for strengthening the elongate member; and
the sidewalls angled inwardly toward each other at a predetermined angle for allowing particulate material passing through the screening module to pass by the elongate members without contacting the elongate members.

26. A screening deck frame according to claim 25, the module including an array of sieve apertures and a solid margin surrounding the array, wherein the frame includes a frame edge member defining an outboard edge of the frame, the frame edge member fixed to one end of each of a plurality of the cross members in parallel relationship to the elongate members;
the frame edge member having a width approximately equal to the width of the module margin for supporting the outboard edge of the module while maximizing the useful screening area of the deck.

27. A screening deck frame according to claim 26 including a rigid split lock pin fixed to the frame edge member for removably connecting the module to the frame along the outboard edge of the frame.

28. A screening deck frame according to claim 25 each module including an inlet side and an outlet side, a solid peripheral margin of a predetermined width and a grid defining a plurality of sieve apertures, each sieve aperture tapering outward toward the outlet side of the module at an opening angle, wherein;

the predetermined angle is at least equal to the opening angle; and the top section of each elongate member has a width substantially equal to twice the width of the module margin so that the margins of two abutting modules cover the top section and particulate material passing through the sieve apertures passes by the depending sidewalls substantially without contacting the sidewalls.

29. A screening deck frame according to claim 28 in which the opening angle is approximately 2 degrees and the predetermined angle is approximately 10 degrees.

30. A planar screening deck frame comprising:
a rigid elongate edge member defining an outboard edge of the frame; and
a split lock pin fixed to the edge member for removably retaining a screening module positioned on the frame extending over the edge member.

31. A planar screening deck frame according to claim 30 wherein the split lock pin is hemi-cylindrical, having a longitudinal axis normal to the plane of the frame and defining a flat side parallel to the outboard edge of the frame and also includes a semiannular collar removably engaging the screening module.

32. A screening method comprising the steps of:
providing a rigid, planar frame for supporting a plurality of screening modules;
providing a resilient lock pin;
connecting the lock pin to the frame extending normal to the plane of the frame;
providing a plurality of screening modules;
positioning each module on the frame adjacent the lock pin;
interlockingly engaging the lock pin and each module so that the lock pin maintains the positioning of each module on the frame.

33. A method according to claim 32 including:
disengaging each module from the lock pin;
removing each module from the frame while the lock pin remains connected to the frame;
positioning a replacement module on the frame; and
interlockingly engaging the lock pin and the replacement module so that the lock pin maintains the positioning of the replacement module on the frame.

34. A method according to claim 32 wherein connecting the lock pin includes inserting the lock pin into an aperture in the frame from an inlet side of the frame before engaging the lock pin and each module.

35. A method according to claim 32 wherein disengaging the lock pin and each module includes:
providing rigid means for disengaging the lock pin;
inserting the disengaging means between the sidewalls of adjacent modules from the inlet side of the modules; and
moving the disengaging means so as to separate the module and the lock pin.

36. A method according to claim 32
providing at least two screening modules;
positioning said at least two screening modules on the frame side-by-side; and
interlockingly engaging the lock pin and said at least two screening modules so that a first section of the lock pin engages one module and a second section of the lock pin engages the other module to maintain the positioning of both modules on the frame and to allow removal and replacement of either or both of the modules while the lock pin remains connected to the frame.

37. A method of preventing abrasive wear of an elongate frame member in a screening deck, the deck including a pair of screening modules each including a screening area and a solid margin of predetermined width surrounding the screening area, positioned side-to-side along the elongate member, the method comprising the steps of:
providing as the elongate frame member an elongate member having an inverted U-shape cross section defining a top section for supporting the modules and a pair of depending sidewalls;
sizing the top section of the elongate frame member to a width less than twice the width of the solid margin;
positioning the pair of screening modules on the elongate frame member such that the solid margins of the modules cover the top section; and
tapering the depending sidewalls inwardly toward each other such that particulate material can pass through the screening modules without contacting the depending sidewalls.

38. A method of removably connecting a screening module having first and second parallel sidewalls and a recess in the first sidewall to a frame along an outboard edge of the frame, the frame including a rigid elongate frame edge member, having a flat top side of a predetermined width extending along the outboard edge of the frame and defining an outboard edge of the frame edge member, and a second elongate member, parallel to the frame edge member and spaced apart therefrom a distance approximately equal to the width of the module between the parallel sidewalls for supporting the module on the frame, the method comprising:
providing a lock pin having an axis and adapted for interlocking engagement with the module in the recess to prevent relative movement therebetween along the axis;
fixing the lock pin to the top side of the frame edge member extending normal to the top side;
positioning the module over the frame with the first sidewall along the frame edge member;
interlockingly engaging the lock pin and the recess in the first sidewall; and
after said interlockingly engaging, moving the second sidewall into abutting relationship with the second elongate member to connect the module to the frame.

39. A module system for diverting particulate material comprising:
a surface for supporting a module positioned thereon, said surface including mounting aperture means;
a module for diverting particulate material mounted on a lock pin; and
said lock pin including means for connecting the lock pin to the mounting aperture means in the support surface, and also including means for interlockingly and removably engaging the module to maintain the positioning of the module on the support surface when the lock pin is connected to the support surface;
the lock pin remaining connected to the support surface while allowing removal of the module from the support surface and mounting of a replacement module on the support surface.

* * * * *